United States Patent [19]

Moore

[11] 4,117,525
[45] Sep. 26, 1978

[54] OVERPRESSURE PROTECTION FOR VAPORIZATION COOLED ELECTRICAL APPARATUS

[75] Inventor: Curtis L. Moore, Hermitage, Pa.

[73] Assignee: Electric Power Research Institute, Inc., Palo Alto, Calif.

[21] Appl. No.: 831,716

[22] Filed: Sep. 9, 1977

[51] Int. Cl.² ............................................. H02H 7/04
[52] U.S. Cl. ............................ 361/37; 165/DIG. 14;
  165/105; 174/11 R; 174/15 R; 336/57; 361/41
[58] Field of Search ...................... 361/37, 35, 38, 41;
  174/11 R, 12 R, 15 R, 17 LF, 17 GF;
  165/DIG. 14, 105; 336/55, 57, 58

[56] References Cited

U.S. PATENT DOCUMENTS 2,640,101   5/1953   Hughes .......................... 174/11 R X
2,904,616   9/1959   Koepke et al. .................... 174/11 R

*Primary Examiner*—Thomas J. Kozma
*Attorney, Agent, or Firm*—William M. Hanlon, Jr.

[57] ABSTRACT

Overpressure protection for a vaporization cooled electrical inductive apparatus. A pressure responsive device is actuated by a predetermined pressure within a sealed housing and de-energizes a pump, thereby stopping the flow of dielectric fluid to the heat producing members which prevents further pressure increases within a tank due to continued vaporization of the dielectric fluid. In one embodiment, a discharge valve is actuated by the pressure responsive device to drain the dielectric fluid from the windings to prevent further pressure increases caused by continued vaporization of the dielectric fluid. A fusible link is provided to disconnect the windings of the electrical inductive apparatus from a source of electrical potential subsequent to the de-energization of the pump. In another embodiment, the pressure responsive device actuates the circuit breaker which disconnects the windings of the electrical inductive apparatus from the source of electrical potential.

11 Claims, 5 Drawing Figures

FIG. I

OVERPRESSURE PROTECTION FOR VAPORIZATION COOLED ELECTRICAL APPARATUS

BACKGROUND OF THE INVENTION

1. Field of the Invention

This invention relates, in general, to electrical inductive apparatus and, more specifically, to vaporization cooled electrical inductive apparatus.

2. Description of the Prior Art

Vaporization cooled systems have been proposed for electrical inductive apparatus, such as transformers, reactors and the like, utilizing two-phase dielectric fluids which have a boiling point within a normal operating temperature range of the electrical inductive apparatus. Dielectric fluid is applied to the electrical inductive apparatus in its liquid state, whereon it evaporates as it contacts the heat producing members and removes heat in quantities equal to the latent heat of vaporization of the dielectric fluid. The resulting vapors are then condensed and reapplied to the heat producing elements in a continuous cycle.

The pressure within the tank of a vaporization cooled electrical inductive apparatus is determined by the partial pressure of the non-condensable gas, such as $SF_6$, which is used to provide electrical insulation upon startup and also the partial pressure of vaporized dielectric fluid. The partial pressure of the dielectric fluid in its liquid state is small in comparison to its pressure contribution as it boils or is vaporized from the electrical inductive apparatus. Thus, as load is applied to the electrical inductive apparatus and its temperature accordingly increases, a greater proportion of the dielectric fluid will vaporize, thereby increasing the pressure within the tank of the electrical inductive apparatus. An uncontrolled rise in the pressure resulting from a fault could cause a pressure created explosion or rupture of the tank. This poses a problem since the most economical choices for the dielectric fluids in a vaporization cooled electrical inductive apparatus have a toxicity level such that they can be applied only under controlled conditions; but would cause an undesirable or hazardous level of vapors to both humans and the environment in the vicinity of the transformer following a pressure created explosion or rupture of the tank. Thus, it is essential that overpressure rupture of the tank of a vaporization cooled electrical inductive apparatus be prevented.

Typical prior art methods of providing overpressure protection for electrical inductive apparatus, such as transformers, include relief valves and sudden pressure relays. These devices either vent to the surrounding air to reduce the tank pressure or provide electrical contacts for de-energizing the transformer or sounding an alarm. Although satisfactory in conventional oil-filled transformers, the need to contain the vapors within the tank makes the venting type relief devices unsuitable. Furthermore, the sudden pressure relays, being designed to react to a pressure wave in a fluid, are less effective in a gas environment.

Thus, it would be desirable to provide improved overpressure protection for a vaporization cooled electrical inductive apparatus. It would also be desirable to provide improved overpressure protection which prevents the possibility of a tank rupture thereby permitting the usage of economical but toxic dielectric fluids.

SUMMARY OF THE INVENTION

Herein disclosed is a vaporization cooled electrical inductive apparatus with improved overpressure protection. In a vaporization cooled electrical inductive apparatus, such as a transformer, a dielectric fluid, vaporizable within a normal temperature range of the transformer, vaporizes as it is applied to the winding and dissipates heat in quantities equal to the latent heat of vaporization of the dielectric fluid. In a typical vaporization cooling system, the dielectric fluid is applied in a thin film over the windings by a spray device situated above the windings and disposed in fluid flow communication with a pump located below the liquid level of dielectric fluid in the bottom of the transformer housing. A pressure responsive device, such as a pressure switch, is provided which is energizable at a predetermined pressure within the housing. Switchable electrical contacts, responsive to the pressure switch, disconnect the pump from its source of electrical power, thereby halting the flow of dielectric fluid to the windings which prevents further increases in tank pressure due to continued vaporization of dielectric fluid. In another common vaporization cooling system construction, the pump is disposed in fluid flow communication with a container which surrounds the windings such that the windings are fully immersed in the dielectric fluid. Again, the pump is de-energized in response to the actuation of the pressure switch which stops the flow of dielectric fluid to the container and the windings disposed therein. In addition, a discharge means, such as an electrically-operated valve, is disposed in fluid flow communication with the container and, in response to the actuation of the pressure switch, opens to discharge the liquid from the container which thereby prevents further pressure increases by stopping the vaporization of the dielectric fluid. In either embodiment, upon de-energization of the pump, the dielectric fluid returns to the bottom of the housing and the resulting over-temperature will eventually cause the coils to burn up.

There is also provided means to protect the windings from destruction by disconnecting them from their source of electrical power in response to an overpressure condition within the housing. Accordingly, a fusible link is serially connected between the winding and its source of electrical power and is situated beneath a suitable spray device. De-energization of the pump stops the flow of dielectric fluid through the spray device, as described above, thereby allowing the fusible link to heat up and eventually burn open disconnecting the winding from its source of electrical power. Also provided are means to operate the circuit breaker in response to an overpressure signal from the pressure switch to again disconnect the windings from their source of electrical power. The fusible link, described above, may be utilized in conjunction with the circuit breaker mechanism to provide additional overpressure protection in the event that the circuit breaker fails to operate.

The above described overpressure protection system provides unique advantages for a vaporization cooled electrical inductive apparatus. The pressure within a tank of a vaporization cooled electrical inductive apparatus is determined by the rate of vaporization of the dielectric fluid, that is, the pressure will increase as additional quantities of dielectric fluid vaporize from the windings. By de-energizing the pump immediately at the beginning of an overpressure condition, continued application of the dielectric fluid to the windings is halted. In one embodiment, the thin film of dielectric fluid on the windings quickly vaporizes, thereby preventing any significant pressure increases within the tank. In the other embodiment, the discharge valve is switched to its open state in response to the overpressure signal, thereby emptying the container of dielectric fluid and preventing further pressure increases that would have resulted from the vaporization of the dielectric fluid remaining within the container.

An additional advantage is achieved by use of the overpressure protection system described above. By significantly decreasing the possibility of a pressure created tank rupture, several economical compounds may be utilized as dielectric fluids in a vaporization cooled electrical inductive apparatus. These compounds have a toxicity level that is dangerous to human life and the environment, and as such, may be utilized only in controlled conditions. These compounds have heretofore been unusable as dielectric fluids since they would cause an undesirable or hazardous level of vapors in the vicinity of a vaporization cooled electrical inductive apparatus following a pressure created rupture of the tank.

BRIEF DESCRIPTION OF THE DRAWING

The various features, advantages and additional uses of this invention will become more apparent by referring to the following detailed description and the accompanying drawing, in which.

DESCRIPTION OF THE PREFERRED EMBODIMENTS

Figure 1:
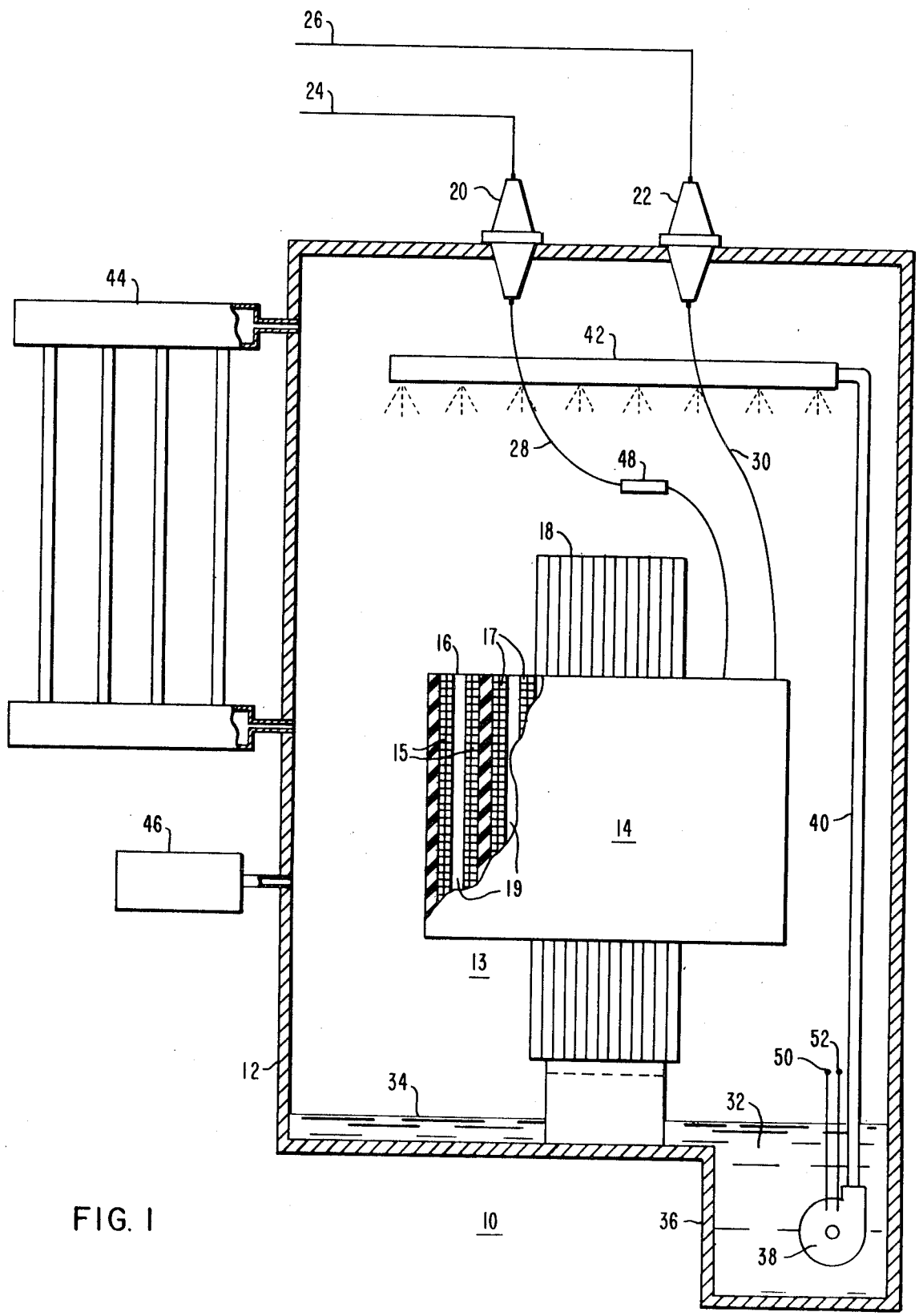
FIG. 1 is an elevational view, partially broken away, of an electrical inductive apparatus constructed according to the teachings of this invention.

Throughout the following description, identical reference numbers are used to refer to the same component in all figures of the drawing.

Referring to the drawing, and to FIG. 1 in particular, there is shown an electrical inductive apparatus 10 constructed according to one embodiment of this invention. The electrical inductive apparatus 10 consists of a sealed enclosure or housing 12 wherein there is disposed a heat producing member 13, such as a transformer, reactor or the like, and hereafter referred to as a transformer. Transformer 13 consists of a magnetic core and coil assembly 14 wherein phase windings 16 are disposed in inductive relation around a magnetic core 18. For clarity, only one vertical leg of the magnetic core 18 and one phase winding 16 are shown. The phase winding 16 consists of a high voltage conductor 15 and a low voltage conductor 17, each of which forms a plurality of turns around the magnetic core 18. In addition, a plurality of vertical cooling ducts 19 are disposed between the turns of the phase winding 16. The cooling ducts 19 are formed by any suitable means, such as by a plurality of circumferentially and radially disposed spacer members or by forming the turns of the windings 16 so as to define vertical passages therebetween for coolant flow. High voltage bushings, 20 and 22, connect the phase windings 16 via supply conductors 28 and 30 to a source of electrical potential, such as the electrical potential carried on line conductors 24 and 26. The low voltage bushings normally connecting the windings 16 to an electric load are not shown.

According to the preferred embodiment of this invention, the transformer 13 is cooled by dielectric fluid 32, which has its boiling point within a normal operating temperature range of the transformer 13. In addition, the dielectric fluid 32 provides electrical insulation between the turns of the phase windings 16 during the operation of the transformer 13. As known to those skilled in the art, fluid dielectrics with such properties generally include the inert fluorocarbon organic compounds such as perfluorodibutyl ether or perfluorocyclic ether. Other examples of compounds that may be used to practice this invention are listed in greater detail in U.S. Pat. No. 2,961,476, issued to A. Maslin and P. Narbut. In operation, the dielectric fluid 32 is applied in its liquid state to the vertical ducts 14 disposed within the phase windings 16 of the transformer 13. The dielectric fluid 32 will evaporate as it contacts the heat producing windings 16 and transfer heat from the windings 16 in quantities equal to the latent heat of vaporization of the fluid 32. The vapors, thus evolved, will flow through the ducts 19 into the auxiliary cooler or radiator 44, whereon they will subsequently condense and return to the bottom of the housing 12.

The inert fluorocarbons utilized as dielectric fluids in vaporization cooled transformers are quite expensive and, thus, economics dictate that the quantity of such fluids be minimized. Furthermore, the dielectric fluid 32 must be distributed over the entire surface of the windings 16 to prevent any hot spots from developing within the transformer 13. Accordingly, a quantity of dielectric fluid 32 is disposed within the housing 12 to a level 34 above the bottom of the housing 12. A sump or other suitable reservoir 36 is provided in the bottom of the housing 12 to collect the dielectric fluid 32. A means for supplying dielectric fluid 32 to the winding 16 includes a pump 38 disposed in the sump 36. The supply means further includes a conduit or other suitable fluid conductor 40 which connects the pump 38 in fluid flow communication with a spray device 42 positioned above the transformer 13. The spray device 42, which can be a header or manifold, contains a plurality of apertures which distribute the dielectric fluid 32 to the vertical ducts 19 contained within the phase windings 16 of the transformer 13.

As described above, a portion of the dielectric fluid 32 vaporizes as it flows through the ducts 19 in the windings 16 and removes quantities of heat equal to the latent heat of vaporization of the fluid 32. As the transformer 13 reaches its full or rated load, the vaporization cooling with sufficient dielectric fluid 32 tends to hold down the temperature of the windings 16 to approximately the boiling point of the fluid 32 at the pressure within the tank 12 exerted by the evolved vapors of the dielectric fluid 32. During an extended overload or an external event, such as a fault or short circuit, additional quantities of heat are generated by the phase windings 16 which cause a greater portion of the dielectric fluid 32 to vaporize. Although the vaporization of the dielectric fluid 32 keeps the temperature of the windings constant, the increased volume of vapors results in a pressure increase within the housing 12. Unless expensive pressure vessel construction methods are utilized, the resultant pressure increase could result in a pressure created explosion or rupture of the tank 12. In addition, several of the proposed dielectric fluids, such as perchloroethylene ($C_2Cl_4$), have a toxicity level that would cause an undesirable or dangerous level of vapors to human life or the environment in the vicinity of the transformer 13 following a rupture of the tank 12. Thus, the major limiting factor for a vaporization cooled transformer is excessive pressure, as opposed to excessive temperature as in a conventional oil-filled unit.

In order to prevent a pressure caused rupture of the tank 12 of a vaporization cooled transformer, a unique overpressure protection method is presented. As noted above, the pressure increase within the tank 12 during an overload or external event to the transformer 13 is caused by increased quantities of vaporized dielectric fluid 32 within the tank 12. Thus, in order to prevent a pressure increase, the application or supplying of additional quantities of dielectric fluid 32 to the windings 16 must be stopped. To this end, a suitable pressure responsive means 46, operable at a predetermined pressure, is provided in the tank 12. The pressure responsive means 46, such as a pressure relay or pressure switch, contains a plurality of contacts which are switchably disposable in response to the energization of the pressure responsive device 46 at the predetermined pressure within the tank 12. The contacts associated with the pressure switch 46 may be used to disconnect the pump 38 from its source of electrical potential independently from the connection between the winding 16 and its source of electrical potential, and thereby stop the further spraying or application of dielectric fluid 32 to the windings 16 of the transformer 13. When the application of dielectric fluid 32 is discontinued, the small quantity of dielectric fluid 32 remaining in the windings 16 will quickly flow through the ducts 19 to the bottom of the housing 12. The pressure within the tank 12 would thereby decrease as the remaining dielectric fluid 32 flows or is evaporated from the windings 16.

Figure 3:
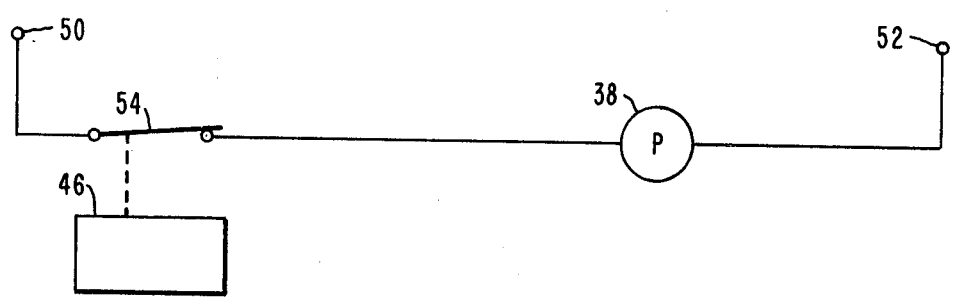
FIG. 3 is a schematic diagram of the overpressure protection control for the pump shown in FIGS. 1, 2 and 4 circuitry.

There is shown in FIG. 3, a schematic diagram of an electrical circuit which connects the pump 38 to a source of electrical potential. The pump 38 is connected by terminals 50 and 52 to a source of electrical potential which can be an external source or, in certain instances, the transformer 13 itself. A normally closed contact 54, operable in response to the energization of the pressure switch 46 is connected between the terminal 50 and the pump 38 and, thereby, de-energizes the pump 38 when it switches states upon the energization of the pressure switch 46 at the predetermined pressure within the tank 12. The insulating system for the electrical apparatus 10 then becomes like a sealed-dry type transformer wherein the pressure within the tank 12 is determined by the average temperature of any noncondensable gases, such as $SF_6$, within the tank 12. As the application of additional coolant to the windings 16 has been stopped, the windings 16 of the transformer 13 would eventually burn up by over-temperature rather than cause a pressure induced rupture of the tank 12.

Instead of sacrificing the windings 16 of the transformer 13 during an overload, suitable means may be provided to disconnect the transformer 13 from its source of electrical potential. As shown in FIG. 1, a fusible link 48 is serially connected between the supply conductor 28 and the high voltage windings 16 of the transformer 13. The fusible link 48 is situated beneath the spray device 42 and is thereby cooled by the dielectric fluid 32 during the normal operation of the transformer 13. Upon cessation of the spraying of the dielectric fluid 32 during an overload, the fusible link 48 will eventually heat up and burn open which will disconnect the winding 16 from its source of electrical potential, and thereby prevent the destruction of the transformer 13.

Figure 2:
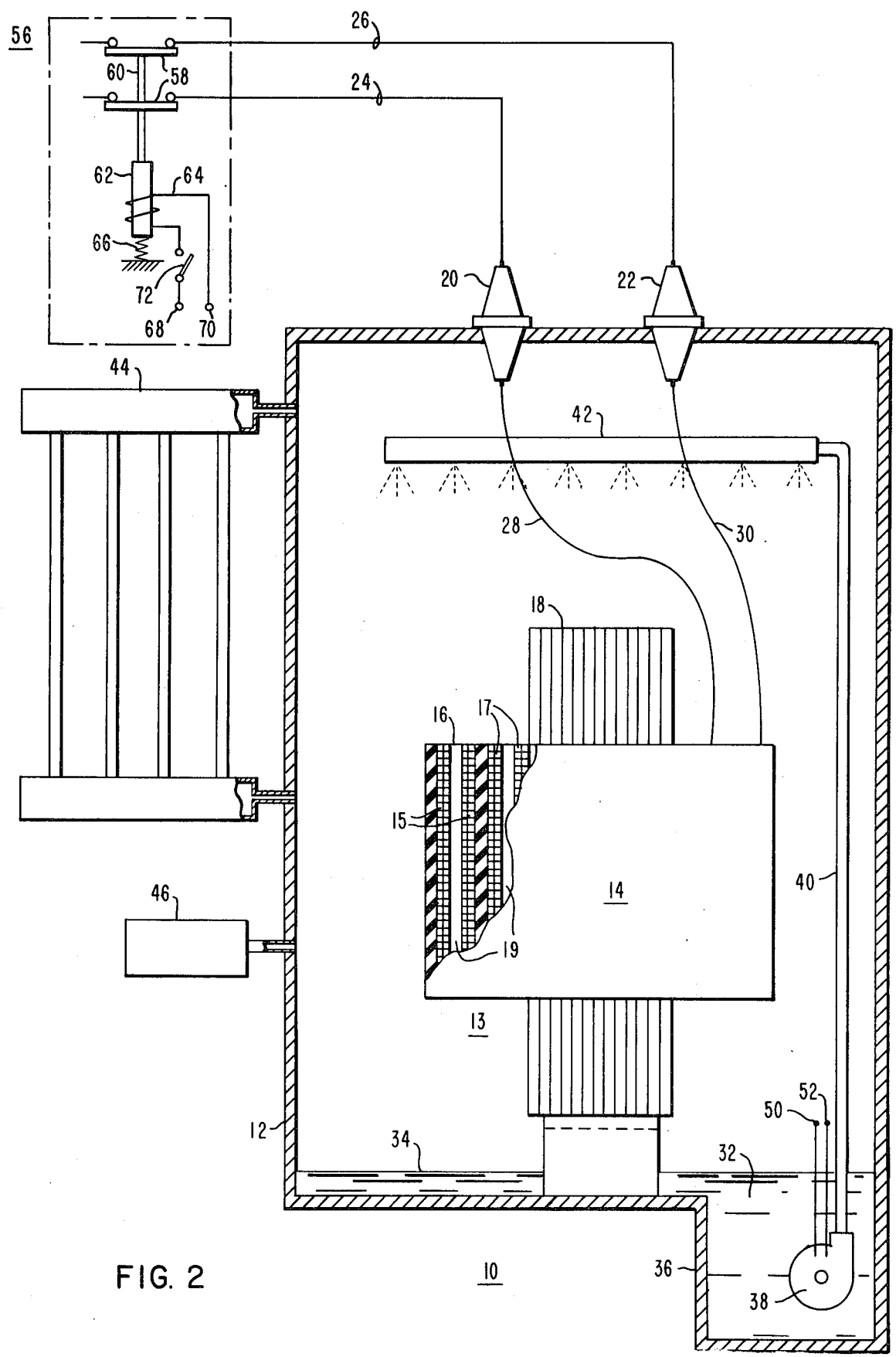
FIG. 2 is an elevational view, partially broken away, of another embodiment of an electrical inductive apparatus constructed according to the teachings of this invention.

There is shown in FIG. 2 an alternate means of disconnecting the transformer 13 from its source of electrical potential in response to the energization of the pressure switch 46. A circuit breaker 56 is provided which contains means responsive to the pressure switch 46. The circuit breaker 56 includes movable contacts 58 which are serially connected in the line conductors 24 and 26. The movable contacts 58 are connected together by an operating member 60 which is in turn connected to a magnetic core 62. The position of the magnetic core 62 and the operating member 60 is determined by the energization of an operating coil 64 which receives electrical power through terminals 68 and 70. In order to effect a return of the magnetic core 62 to its normal position after having been actuated as a result of current flow to the coil 64, a compression spring 66 is provided. A normally open contact 72, responsive to the actuation of the pressure device 46, is interposed between terminal 68 and the electric coil 64, thereby energizing the coil 64 upon actuation of the pressure device 46 which will retract the operating member 60 and thereby disconnect the transformer 13 from the source of electrical potential. It is also contemplated that the circuit breaker 56, thus described, can be used in conjunction with the fusible link 48 described above to provide back-up overpressure protection in the event that the circuit breaker 56 fails to operate.

Figure 4:
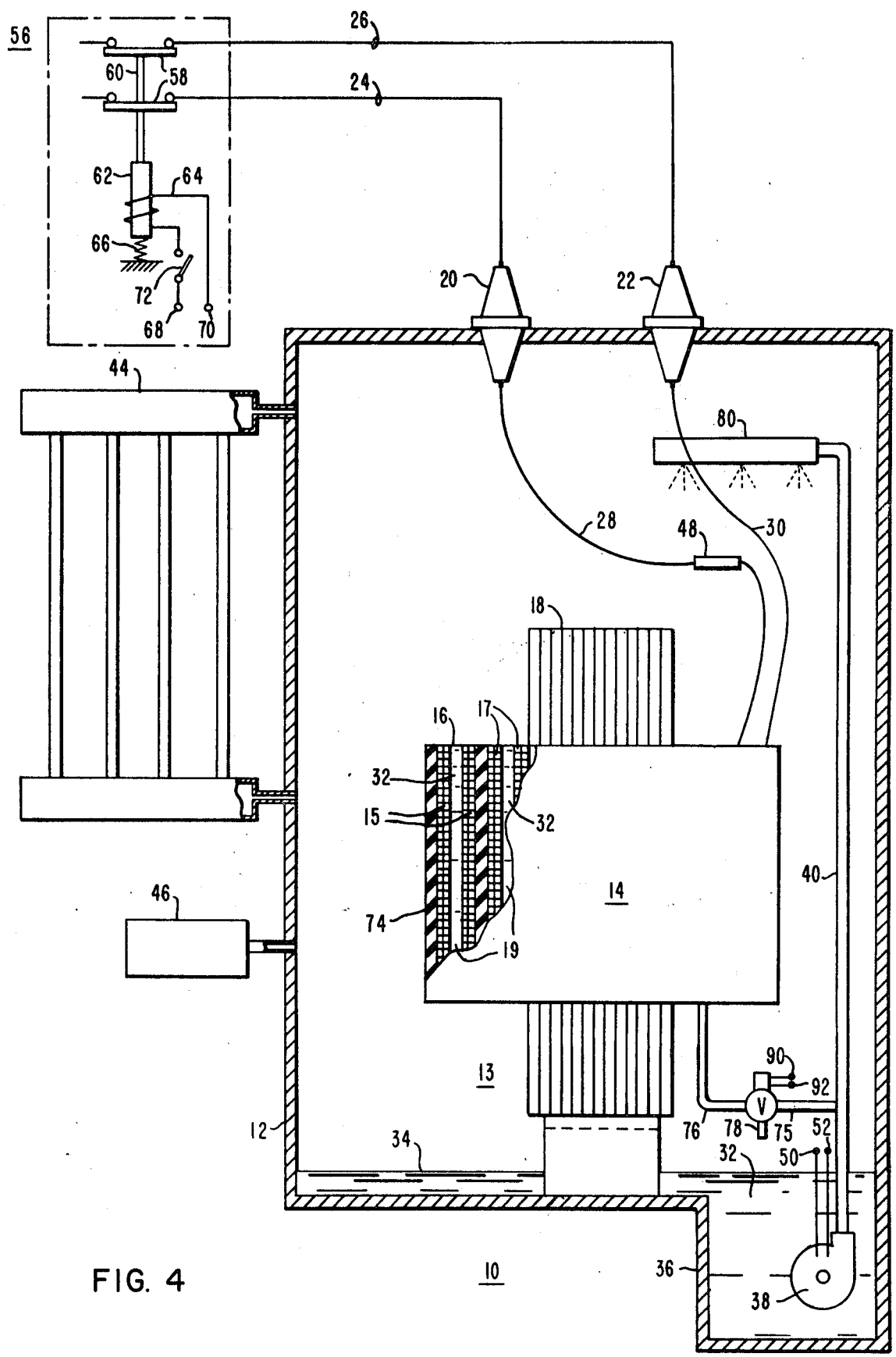
FIG. 4 is an elevational view, partially broken away, of another embodiment of an electrical inductive apparatus constructed according to the teachings of this invention.

There is shown in FIG. 4 another embodiment of this invention which is identical to the embodiment shown in FIGS. 1 and 2 except that the windings 16 are fully immersed in dielectric fluid 32 instead of covered with a thin film. Accordingly, a container 74, constructed of suitable insulating material, such as one sold commercially under the tradename "Micarta", surrounds at least the sides and the bottom of the windings 16 of the transformer 13 in fluidtight relationship. Conduits 75 and 76 and discharge valve 78 connect the container 74 in fluid flow communication with the supply conduit 40, thereby allowing pump 38 to continuously supply dielectric fluid 32 to the windings 16 within the container 74. The pump 38 will fill the container 74 with dielectric fluid 32 such that the windings 16 are fully immersed in the dielectric fluid 32 which provides adequate cooling and electrical insulation during the normal operation of the transformer 13. Any excess dielectric fluid 32 supplied to the container 74 will flow out over the upper ends of the container 74 and be returned to the sump 36 in the bottom portion of the housing 12. The cooling of the transformer 13 in this embodiment is effected in the same manner as in the previous embodiment of this invention in that the liquid dielectric fluid 32 contained within the cooling ducts 19 between the windings 16 dissipates heat from the windings 16 in quantities equal to the latent heat of vaporization of the dielectric fluid 32. The evolved vapors will flow through the cooling ducts 19 into the housing 12 and the radiator 44 wherein they will subsequently condense and flow to the sump 36 in the bottom portion of the tank 12.

Figure 3A:
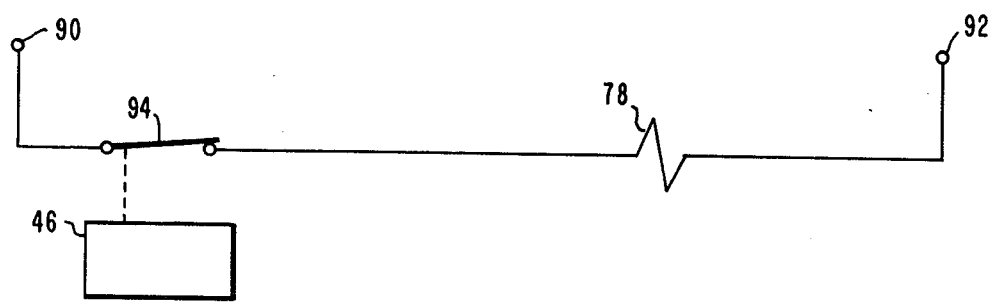
FIG. 3A is a schematic diagram of the overpressure protection circuitry for the valve shown in FIG. 4.

Overpressure protection for the electrical apparatus 10 shown in FIG. 4 is achieved in an identical manner as that shown in FIGS. 1 and 2 and described above. A predetermined pressure within the tank 12 will energize pressure switch 46; whereon the contacts associated with the pressure switch 46, such as contact 54 shown in FIG. 3, will switch to an open position, thereby disconnecting the pump 38 from its source of electrical potential which stops the supplying of dielectric fluid 32 to the windings 16. In addition, discharge valve 78, which may be of the electrically operated type, is disposed in fluid flow communication between conduits 75 and 76. As seen in FIG. 3A, the discharge valve 78 is energized when electrical power is applied to the terminals 90 and 92 thereby closing the valve 78 and allowing the pump 38 to supply dielectric fluid to the windings 16 within the container 74. In response to an overpressure signal from the pressure switch 46, contact 94, shown in FIG. 3A, will open, thereby de-energizing the discharge valve 78 which places the valve 78 in an open state and allows the dielectric fluid 32 within the container 74 to drain from the windings into the sump 36 in the bottom of the tank 12. Valve 78 may also be connected in parallel with the pump 38 in which case, it would receive electrical potential through terminals 50 and 52. It is essential that the dielectric fluid 32 contained within the windings 16 be drained from the container 74 at the beginning of the overpressure condition. If the dielectric fluid 32 is allowed to remain within the container 74 after the de-energization of the pump 38, the further evaporation of this fluid 32 would result in an undesirable pressure increase within the tank 12 which could lead to a pressure caused explosion or rupture of the tank 12. By opening the discharge valve 78 in response to an overpressure signal from the pressure switch 46, the dielectric fluid 32 disposed within the container 74 is quickly drained from the windings 16, thereby preventing any further increase in pressure within the tank 12 and eliminating the possibility of a tank rupture.

After the dielectric fluid 32 has been discharged from the windings 16, the windings 16 will burn up in the noncondensable gas atmosphere within the tank 12. To prevent this from occurring, the windings 16 may be protected by disconnecting them from their source of electrical potential as described above. Thus, fusible link 48 may be provided between the supply conductor 28 and the high voltage windings 16 of the transformer 13. Spray device 80 is provided to cool the fusible link 48 by distributing a film of dielectric fluid 32 over the fusible link 48. Furthermore, circuit breaker mechanism 56, responsive to the pressure switch 46, may be utilized by itself or in conjunction with the fusible link 48 to disconnect the windings 16 from the source of electrical potential in the same manner as previously described.

Thus, it will be apparent to one skilled in the art that there has been disclosed a vaporization cooled electrical inductive apparatus with improved overpressure protection. By de-energizing the supply pump in response to a overpressure signal from a pressure responsive device, the flow of dielectric fluid to the windings of the transformer is stopped, thereby preventing a further increase in tank pressure which could lead to a pressure induced explosion or rupture of the tank. Furthermore, the unique overpressure protection methods disclosed herein permits the usage of economical dielectric fluids having an undesirable level of toxicity since the possibility of a pressure caused explosion or tank rupture is significantly reduced. Finally, the use of a discharge valve, energizable by the pressure responsive device, allows the dielectric fluid to quickly drain from the windings in a totally immersed type of vaporization cooled electrical inductive apparatus which again prevents a further increase in internal tank pressure.

What is claimed is:
1. Electrical inductive apparatus comprising:
   a sealed housing;
   a magnetic core disposed within said sealed housing;
   an electrical winding disposed in inductive relation with said magnetic core;
   means for connecting said electrical winding to a source of electrical potential;
   a dielectric fluid, vaporizable within the normal operating temperature range of said electrical inductive apparatus, disposed within said sealed housing;
   means, including an electrically operated pump, for supplying said dielectric fluid to said winding;
   means for connecting said pump to a source of electrical potential; and
   means for detecting when the pressure in said sealed housing reaches a predetermined value, said means for connecting said pump to a source of electrical potential being responsive to said pressure detecting means to disconnect said pump from the source of power independent from said means for connecting said winding to a source of electrical potential when the pressure within said sealed housing reaches the predetermined value.

2. The electrical inductive apparatus of claim 1 wherein the supplying means includes a spray device situated above the winding and disposed in fluid flow communication with the pump to apply dielectric fluid to said winding.

3. The electrical inductive apparatus of claim 1 further including a container having at least sides and a bottom surrounding the winding and means for disposing said container and the pump in fluid flow communication.

4. The electrical inductive apparatus of claim 3 further including means, responsive to the pressure detecting means, for discharging the dielectric fluid from the container.

5. The electrical inductive apparatus of claim 4 wherein the discharge means includes an electrically operable valve having open and closed states and disposed in fluid flow communication between the container and the housing, and further including means for connecting said valve to a source of electrical potential, said connecting means being responsive to the pressure detecting means to switch said valve to said open state when the pressure within the sealed housing has reached the predetermined value such that the dielectric fluid is discharged from the container.

6. The electrical inductive apparatus of claim 5 wherein the means for connecting a source of electrical potential to the valve includes an electrical contact having open and closed states and being switchable therebetween in response to said pressure detecting means, said electrical contact being serially connected between the means for connecting said valve to said source of electrical potential and said valve.

7. The electrical inductive apparatus of claim 1 wherein the means for connecting the pump to a source of electrical potential includes at least one electrical contact having open and closed states and being switchable therebetween in response to the pressure detecting means, said electrical contact being serially connected between said pump and the means for connecting said pump to a source of electrical potential.

8. The electrical inductive apparatus of claim 1 wherein the pressure detecting means is a pressure switch operable at a predetemined pressure.

9. The electrical inductive apparatus of claim 1 wherein the means for connecting the winding to a source of electrical potential is responsive to the pressure detecting means to disconnect said winding from the source of electrical potential independently from the means for connecting the pump to a source of electrical potential.

10. The electrical inductive apparatus of claim 9 wherein the means for connecting the winding to a source of electrical potential includes:

a circuit breaker having at least one movable contact associated therewith, said contact being serially connected between the winding and said means for connecting said winding to the source of electrical potential; and means, responsive to the pressure detecting means, to operate said circuit breaker such that said contact associated therewith is switched to an open state to disconnect said winding from the source of electrical potential.

11. The electrical inductive apparatus of claim 9 wherein the means for connecting the winding to a source of electrical potential includes a fusible link serially connected between said means for connecting said winding to a source of electrical potential and said winding and disposed so as to be cooled by the flow of dielectric fluid from the supplying means such that said fusible link will burn open subsequent to the de-energization of said supplying means thereby disconnecting the winding from its source of electrical potential.

* * * * *